United States Patent
Ihm et al.

(10) Patent No.: US 9,001,144 B2
(45) Date of Patent: Apr. 7, 2015

(54) IMAGE PROCESSING APPARATUS AND METHOD

(75) Inventors: In Sung Ihm, Seoul (KR); Bong Jun Jin, Seoul (KR); Chan Min Park, Seoul (KR); Won Jong Lee, Seoul (KR); Seok Yoon Jung, Seoul (KR)

(73) Assignees: Samsung Electronics Co., Ltd., Suwon-si (KR); Industry-University Cooperation Foundation Sogang University, Seoul (KR)

( * ) Notice: Subject to any disclaimer, the term of this patent is extended or adjusted under 35 U.S.C. 154(b) by 826 days.

(21) Appl. No.: 12/662,659

(22) Filed: Apr. 27, 2010

(65) Prior Publication Data

US 2010/0277478 A1 Nov. 4, 2010

(30) Foreign Application Priority Data

Apr. 29, 2009 (KR) ........................ 10-2009-0037527

(51) Int. Cl.
*G09G 5/00* (2006.01)
*G09G 5/14* (2006.01)
*G06T 15/50* (2011.01)

(52) U.S. Cl.
CPC ............... *G09G 5/14* (2013.01); *G06T 15/503* (2013.01); *G06T 2200/12* (2013.01); *G09G 2320/02* (2013.01); *G09G 2340/0457* (2013.01); *G09G 2340/10* (2013.01)

(58) Field of Classification Search
CPC .... G06T 15/503; G06T 2200/12; G06T 15/06
USPC ....................................................... 345/611
See application file for complete search history.

(56) References Cited

U.S. PATENT DOCUMENTS

| | | | | |
|---|---|---|---|---|
| 5,943,060 A | * | 8/1999 | Cosman et al. ............... | 345/613 |
| 6,173,372 B1 | * | 1/2001 | Rhoades ....................... | 711/147 |
| 6,501,483 B1 | * | 12/2002 | Wong et al. .................. | 345/611 |
| 7,456,846 B1 | * | 11/2008 | King et al. .................... | 345/613 |
| 2004/0247179 A1 | * | 12/2004 | Miwa et al. ................... | 382/173 |
| 2005/0068326 A1 | * | 3/2005 | Nakahashi et al. ........... | 345/530 |
| 2005/0179698 A1 | | 8/2005 | Vijayakumar et al. | |
| 2006/0176316 A1 | * | 8/2006 | Nagasaki et al. ............. | 345/621 |
| 2006/0250414 A1 | | 11/2006 | Golovin | |
| 2006/0250655 A1 | * | 11/2006 | Wu ................................ | 358/3.27 |
| 2007/0098265 A1 | * | 5/2007 | Shen et al. .................... | 382/209 |
| 2008/0238920 A1 | | 10/2008 | Brown et al. | |
| 2009/0123089 A1 | * | 5/2009 | Karlov et al. ................. | 382/300 |

FOREIGN PATENT DOCUMENTS

KR    10-2001-0113670    12/2001

OTHER PUBLICATIONS

Jin, Bongjun et al., "Selective and Adaptive Supersampling for Real-Time Ray Tracing," Department of Computer Science and Engineering Sogang University, Korea. pp. 1-9, Aug. 2008.

* cited by examiner

*Primary Examiner* — Ke Xiao
*Assistant Examiner* — Weiming He
(74) *Attorney, Agent, or Firm* — NSIP Law

(57) ABSTRACT

A selector of an image processing apparatus may select, from a plurality of sub-pixels included in a first pixel, at least one sub-pixel to be anti-aliased. A processor of the image processing apparatus may calculate a color value of the first pixel by performing an anti-aliasing process with respect to each of the selected at least one sub-pixel.

37 Claims, 10 Drawing Sheets

IMAGE PROCESSING APPARATUS AND METHOD

CROSS-REFERENCE TO RELATED APPLICATIONS

This application claims the benefit of Korean Patent Application No. 10-2009-0037527, filed on Apr. 29, 2009, in the Korean Intellectual Property Office, the disclosure of which is incorporated herein by reference.

BACKGROUND

1. Field

One or more embodiments relate to an image processing apparatus and method for anti-aliasing that may be used for ray tracing of three-dimensional (3D) rendering.

2. Description of the Related Art

A three-dimensional (3D) rendering scheme corresponds to an image processing scheme that may generate and provide an image at a particular viewpoint based on modeled virtual 3D object information. The 3D rendering scheme may include polygon-based rasterization, ray tracing of tracing a ray progress path inversely from a viewpoint desired to be rendered, and the like.

Ray tracing may use physical properties of light, such as reflection, refraction, and penetration, and thus may generate an enhanced image close to an actual image. On the other hand, ray tracing may use large amounts of calculations and thus have difficulty in realizing real-time rendering.

Aliasing denotes a staircase phenomenon occurring due to a precision or resolution difference between a scene to be rendered and an apparatus to display the scene. Anti-aliasing denotes a process of reducing aliasing using an image processing method.

Anti-aliasing may be performed by sampling an area corresponding to a single pixel a plurality of times, that is, by calculating a color value of the pixel through plural samples. It is also referred to as super sampling.

The super-sampling operation may use high specification hardware for calculations.

SUMMARY

Accordingly, the present inventors have found a desire for an adaptive super-sampling method that may selectively perform super-sampling of only pixels to be anti-aliased instead of all the pixels.

According to an aspect of one or more embodiments, there may be provided an image processing apparatus, including a selector to select, from a plurality of sub-pixels included in a first pixel, at a sub-pixel to be anti-aliased, and a processor to calculate a color value of the first pixel by performing an anti-aliasing process with respect to the selected sub-pixel.

The anti-aliasing process may correspond to a super-sampling operation.

The selector may perform ray tracing with respect to the first pixel and eight neighboring pixels adjacent to the first pixel using a single ray, to calculate an initial color value and a characteristic value of each of the first pixel and the eight neighboring pixels. The selector may compare the characteristic value of the first pixel with the characteristic value of each of the eight neighboring pixels to select, from the plurality of sub-pixels included in the first pixel, the sub-pixel to be anti-aliased.

The characteristic value may be determined based on an object identifier of an object colliding with the single ray.

The characteristic value may be determined based on at least one of a shadow count, a texture state, and a normal vector of a portion of an object colliding with the single ray.

When a difference between the initial color value of the first pixel and the initial color value of each of the eight neighboring pixels is greater than or equal to a first threshold, the selector may compare the characteristic value of the first pixel with the characteristic value of each of the eight neighboring pixels to select, from the plurality of sub-pixels included in the first pixel, the sub-pixel to be anti-aliased.

When an inner product between a normal vector corresponding to an intersecting point of an object and a normal direction of a predetermined sub-pixel among the plurality of sub-pixels, and a normal vector of the pixel is less than or equal to a second threshold, the selector may select the predetermined sub-pixel as the sub-pixel to be anti-aliased.

The image processing apparatus may further include a buffer memory to sequentially store selected sub-pixels, selected by the selector from the plurality of sub-pixels. The processor may perform super-sampling of the stored sub-pixels according to an effective parallel processing scheme such as a single instruction multiple data (SIMD) architecture or a multi-threading scheme, and may calculate the color value of the first pixel using a linear summation of results of the super-sampling and the initial color value of the first pixel.

According to another aspect of one or more embodiments, there may be provided an image processing method, including selecting, from a plurality of sub-pixels included in a first pixel, a sub-pixel to be anti-aliased, and calculating a color value of the first pixel by performing an anti-aliasing process with respect to the selected sub-pixel. The anti-aliasing process may correspond to a super-sampling operation.

Additional aspects, features, and/or advantages of exemplary embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Figure 1:
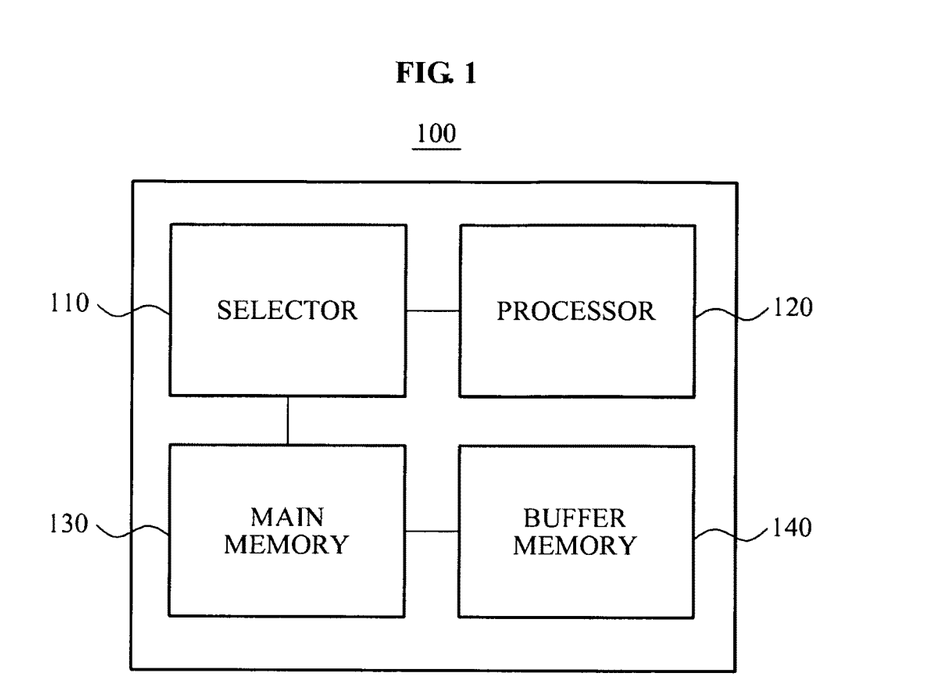
FIG. 1 illustrates an image processing apparatus, according to one or more embodiments.

FIG. 1 illustrates an image processing apparatus 100, according to one or more embodiments.

The image processing apparatus 100 may include a selector 110, a processor 120, and a buffer memory 140, for example.

The selector 110 may select, from a plurality of sub-pixels included in a current pixel, at least one sub-pixel to be anti-aliased.

The processor 120 may calculate initial color values by performing ray tracing once with respect to each of the current pixel and neighboring pixels of the current pixel. The processor 120 may calculate additional color values by performing additional ray tracing a plurality number of times with respect to corresponding sub-pixels selected by the selector 110, and may calculate super-sampled color values based on the calculation results.

The processor 120 may perform ray tracing once with respect to each of the pixels, e.g., without regard to respective sub-pixels. Accordingly, an initial color value of each pixel may be calculated. The initial color value denotes a value in which anti-aliasing has not been performed.

The selector 110 may calculate a characteristic value of each pixel. The characteristic value may be calculated based on, for example, an object identifier (ID) of an object colliding with a primary ray, a normal vector, a shadow count, a texture state, and the like, noting that alternative factors for calculating the characteristic value may also be available. A characteristic value will be further described with reference to FIG. 4.

The selector 110 may thus select, from the plurality of sub-pixels, at least one sub-pixel to be anti-aliased. In this example, the selection may be made based on a determined difference between characteristic values, and a threshold according to a color difference may be applicable.

The buffer memory 140 may store sub-pixels selected by the selector 110. Here, a sequential write scheme may be applied to conform to parallel processing, for example.

The image processing apparatus 100 may further include a main memory 130. The main memory 130 may store geometry information and color information associated with a three-dimensional (3D) modeling object, and may also store information associated with a current rendering viewpoint, a drive program, that is, an algorithm of the image processing apparatus 100, and the like.

An operation of the above described elements will be further described with reference to FIGS. 2 through 5.

Figure 2:
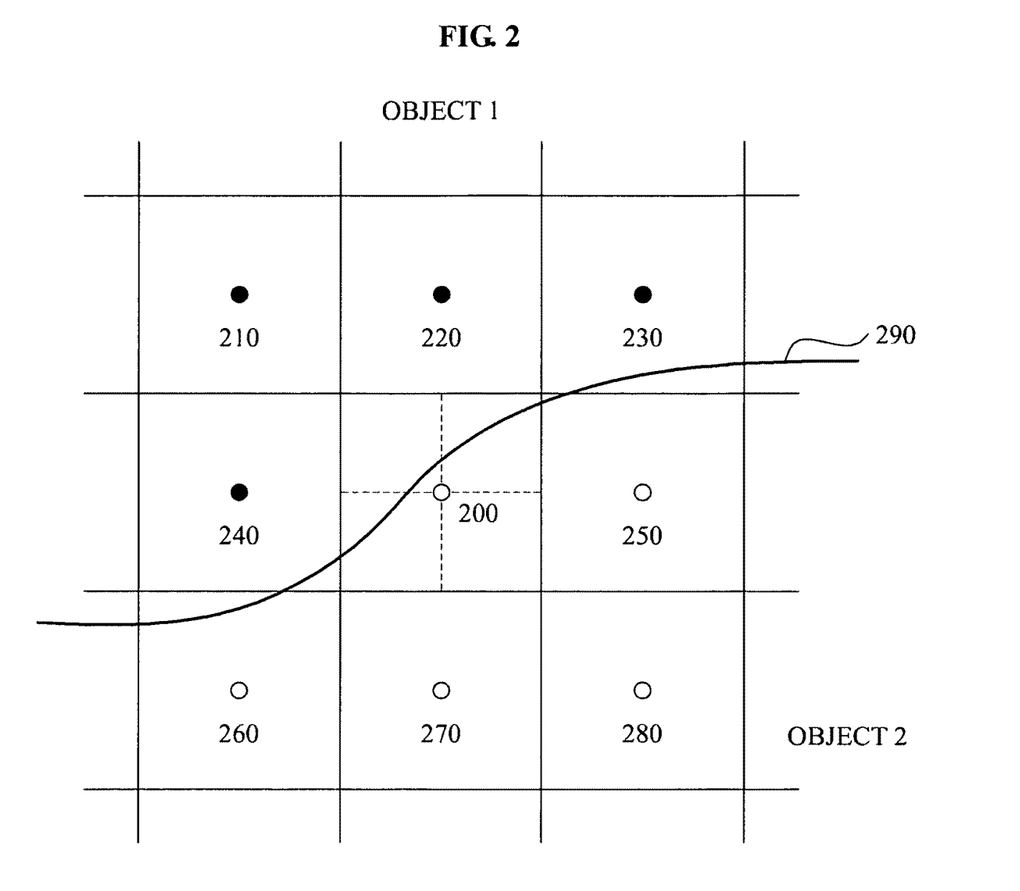
FIG. 2 illustrates a three-dimensional (3D) modeling object and pixels to be anti-aliased, according to one or more embodiments.

FIG. 2 illustrates a 3D modeling object and pixels to be anti-aliased, according to one or more embodiments.

Pixels 200, 210, 220, 230, 240, 250, 260, 270, and 280 correspond to pixels of which color values may be calculated using ray tracing. When ray tracing is performed using a single ray with respect to each pixel, a primary ray departing from each pixel may initially collide with object 1 or object 2. The primary ray denotes a ray departing from a rendering viewpoint or a camera, and then initially colliding with a corresponding object.

The illustrated line 290 denotes a boundary line between the object 1 and the object 2. An object to be collided with may be checked using a single ray from a single point, for example, a central point of the pixel 210. Here, the pixel 210 may collide with the object 1. When the 3D modeling object is configured based on a polygon, for example, a triangle, an object ID of a triangle initially colliding with a ray departing from the central point of the pixel 210 may be a value corresponding to the object 1.

Similarly, in the case of the pixels 220, 230, and 240, an object ID of a triangle colliding with a single sampling ray departing from a central point of each of the pixels 220, 230, and 240 may also be a value corresponding to the object 1. In FIG. 2, the case where an object initially colliding with a sampling ray corresponds to the object 1 has been indicated with a black point in respective pixels.

In the case of the pixels 200, 250, 260, 270, and 280, an object ID of a triangle colliding with a single sampling ray departing from a central point of each of the pixels 200, 250, 260, 270, and 280 may be a value corresponding to the object 2. The case where an object initially colliding with a sampling ray corresponds to the object 2 has been indicated with a white point in respective pixels.

When a color value is obtained by performing ray tracing using a single sampling ray departing from each pixel, for example, each pixel may have a unique initial color value and thus it may be difficult to appropriately express the boundary line 290 between the object 1 and the object 2 based only on this single sampling. It is difficult to appropriately express the boundary line because the pixel resolution is small compared to the precision of the 3D modeling. Consequently, an aliasing phenomenon may occur. Such an aliasing phenomenon may be further understood from FIG. 3.

Figure 3:
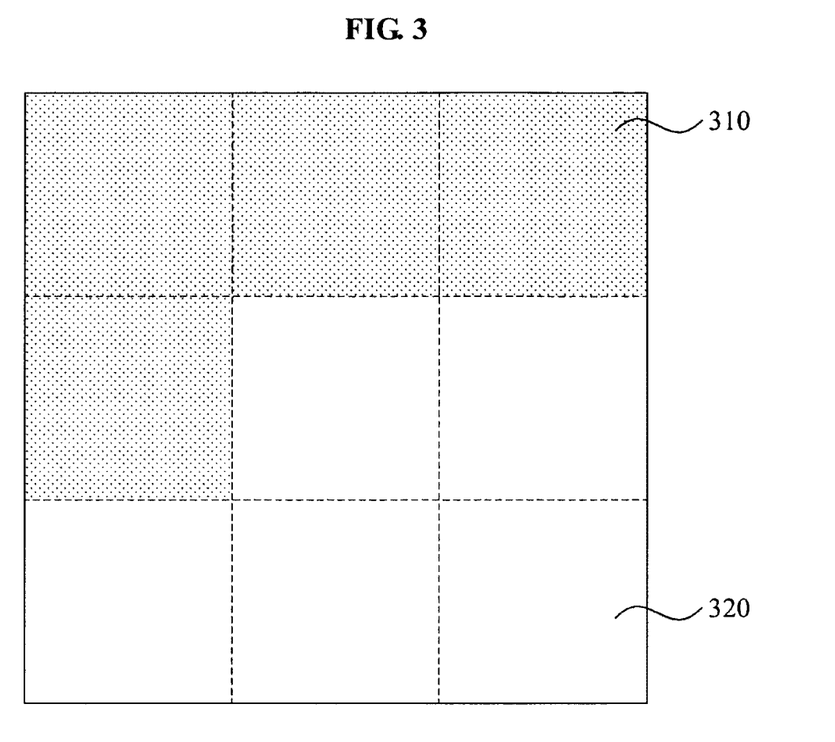
FIG. 3 illustrates a conceptual diagram to explain an aliasing phenomenon, according to one or more embodiments.

FIG. 3 illustrates a conceptual diagram to explain an aliasing phenomenon, according to one or more embodiments.

When an initial color value is determined, that is, based on a sampling using a single ray per pixel, initial color values of the pixels 210, 220, 230, and 240 may be determined in correspondence to the object 1. Similarly, initial color values of the pixels 200, 250, 260, 270, 280, and 290 may be determined in correspondence to the object 2.

In this example, pixels 310 of which initial color values are determined in correspondence to the object 1 may have similar initial color values, and pixels 320 of which initial color values are determined in correspondence to the object 2 may also have similar initial color values.

Accordingly, the boundary between the pixels 310 and the pixels 320 may have a staircase appearance, which is different from the boundary line 290 between the object 1 and the object 2 of FIG. 2. This phenomenon may be referred to as aliasing. Super-sampling indicates an operation of performing ray tracing using a plurality of sampling rays, for example, 4 sampling rays, 16 sampling rays, and the like, with respect to each pixel, and determining, as a color value of a corresponding pixel, an average color value calculated based on the plurality of sampling rays.

An anti-aliasing scheme using existing super-sampling techniques includes performing a super-sampling using a plurality of sampling rays with respect to all pixels of an image to be rendered, or extracting pixels of a boundary portion between objects to perform super-sampling with respect to each of the extracted pixels based on a pixel unit.

According to an embodiment, super-sampling may be performed based on a sub-pixel unit by dividing a single pixel into a plurality of sub-pixels, for example, four sub-pixels, instead of performing super-sampling based on a pixel unit.

The above embodiment will be further described with reference to FIG. 4.

Figure 4:
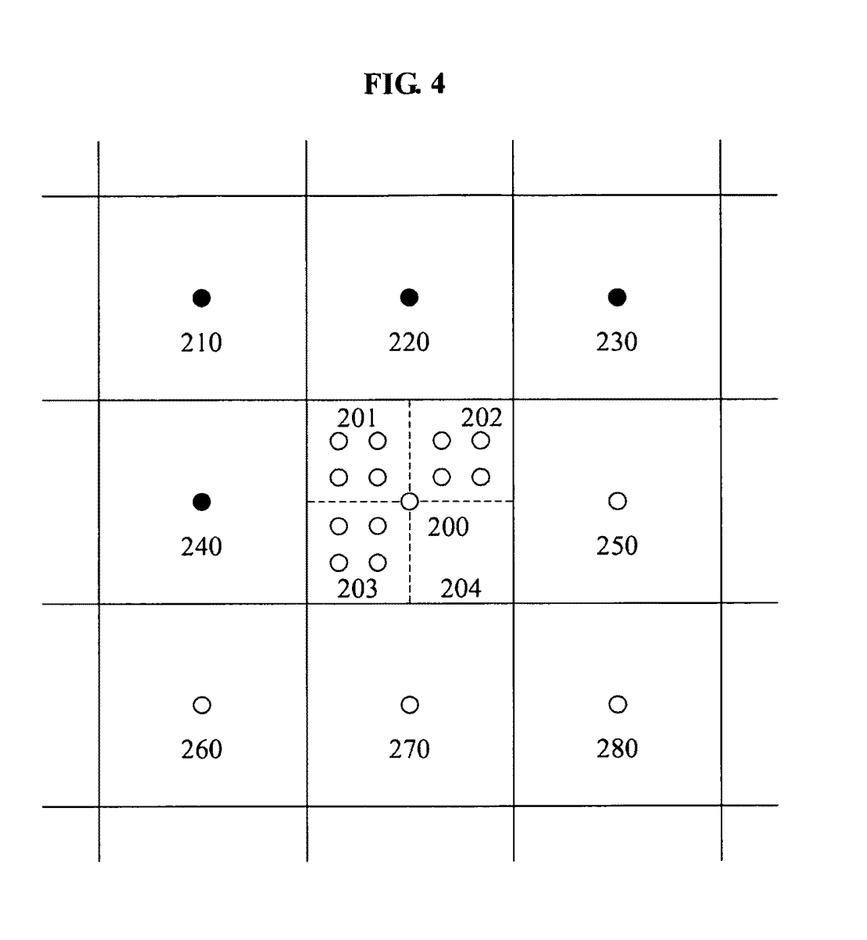
FIG. 4 illustrates a process of selecting, from a plurality of sub-pixels for a particular pixel, a sub-pixel to be anti-aliased, according to one or more embodiments.

FIG. 4 illustrates a process of selecting, from a plurality of sub-pixels, for example, sub-pixels 201, 202, 203, and 204, for a particular pixel, for example, the pixel 200 of FIG. 2, a sub-pixel to be anti-aliased, according to one or more embodiments.

The pixel 200 corresponding to a current color value calculation target may be divided into four portions using four sub-pixels 201, 202, 203, and 204.

An initial color value may be calculated by performing ray tracing using a single sampling ray per pixel.

A characteristic value may be calculated with respect to each pixel. The characteristic value may be a basic reference value used to determine whether each pixel is close to a boundary between objects.

For example, the characteristic value may correspond to an object ID value of an object initially colliding with a sampling ray. As shown in FIG. 4, when all the sampling rays of the pixels 210, 220, 230, and 240 initially collide with the object 1, all the pixels 210, 220, 230, and 240 may have the same characteristic value. Pixels 210, 220, 230, and 240 are accordingly illustrated as having black points.

When all the sampling rays of the pixels 200, 250, 260, 270, and 280 initially collide with the object 2, all the pixels 200, 250, 260, 270, and 280 may have the same characteristic value. Pixels 200, 250, 260, 270, and 280 are accordingly illustrated as having white points.

When a current pixel to be super-sampled for anti-aliasing corresponds to the pixel 200, the pixel 200 may have a different characteristic value from the pixels 210, 220, 230, and 240, and may have the same characteristic value as the pixels 250, 260, 270, and 280.

Generally, it is highly probable that aliasing may occur in pixels of a portion between different objects, that is, pixels of a boundary portions between the objects. An example where the characteristic value is determined based on an object ID of an object colliding with a sampling ray is described above. However, this is only an example and thus various embodiments are equally available.

For example, a normal direction unit vector of a triangle of an object initially colliding with each sampling ray may be used as the characteristic value. In this example, characteristic values may be compared based on an inner product between vectors. When an inner product between two vectors, which are characteristic values of two adjacent pixels, is large, for example, close to "1", a probability that the two adjacent pixels correspond to the same object may increase. In such a situation, the curvature is gentle within the same object, and thus a probability that an edge component may appear or be observed may decrease. Accordingly, an aliasing probability may decrease.

Conversely, when an inner product between two vectors, which are characteristic values of two adjacent pixels, is small, for example, close to zero or approaches a negative number, the curvature may increase within the same object and thus a probability that the edge component may appear or be observed may increase. Accordingly, the aliasing probability may increase, or a probability that the two adjacent pixels correspond to different objects may increase. For example, when the inner product between two vectors that are characteristic values of the two adjacent pixels is less than a predetermined threshold, for example, "0.4", the two adjacent pixels may be determined to be included in a boundary portion between different objects or to be included in a boundary portion within the same object. Here, in an embodiment, anti-aliasing may not be performed.

In addition to an object ID or a normal vector, various factors may be used to determine a characteristic value, alone or together.

For example, the factors used to determine the characteristic value may include a shadow count of a portion of an object colliding with a sampling ray, a texture state of the portion, and the like, noting that alternatives are equally available. Aliasing may occur in a boundary between a shadow portion and a remaining portion excluding the shadow portion. When the texture state is significantly different, pixels may correspond to different objects.

In addition to the primary ray, an object ID, a normal vector, a shadow count, a texture state, and the like, as only examples, according to a secondary ray may be used to determine the characteristic value.

In an embodiment, whether a current pixel corresponds to a pixel of a boundary portion, that is, whether a current pixel corresponds to a pixel or a sub-pixel to be anti-aliased, based on a comparison between the characteristic value of the current pixel 200 and the characteristic value of each of the neighboring pixels 210, 220, 230, 240, 250, 260, 270, and 280, may be determined only when a difference between the initial color value of the current pixel 200 and the initial color value of each of the neighboring pixels 210, 220, 230, 240, 250, 260, 270, and 280 is greater than or equal to a first threshold.

The first threshold may be set to be different depending on a factor used to determine the characteristic value, for example, an object ID, a normal vector, and the like.

For example, when the characteristic value is determined based on the object ID, the first threshold may be set to zero. In this example, when the difference between the initial characteristic value of the current pixel 200 and the initial characteristic value of each of the neighboring pixels 210, 220, 230, 240, 250, 260, 270, and 280 is significantly small, however, the characteristic values may be determined to be different based on the object ID, a corresponding pixel may be determined as a boundary pixel.

When the characteristic value is determined based on a texture state, initial color values of two pixels may be significantly different from each other by setting the first threshold to about "0.5", for example. When characteristic values of the two pixels are also different from each other to some determined extent, the pixels may be determined to be included in the boundary portion.

As described above, various factors may be used to determine the characteristic value, and a predetermined threshold may be adaptively set based on a color difference between each pixel and a neighboring pixel of each pixel.

Whether to perform anti-aliasing, for example, perform super-sampling of each of the four sub-pixels 201, 202, 203, and 204 of the current pixel 200 may be determined by comparing the characteristic value of the current pixel 200 and the characteristic values of the neighboring pixels 210, 220, 230, 240, 250, 260, 270, and 280.

In an embodiment, whether the sub-pixel 201 is to be anti-aliased may be determined by comparing the characteristic value of the current pixel 200 and the characteristic values of the left-top pixel 210, the top pixel 220, and the left pixel 240 based on the current pixel 200.

Determination of anti-aliasing based on the characteristic value difference may include optimistic determination and pessimistic determination.

According to the optimistic determination, when all differences between the characteristic pixel 200 and the characteristic values of the three neighboring pixels 210, 220, and 240 are greater than or equal to a predetermined threshold, the sub-pixel 201 may be determined as a sub-pixel to be anti-aliased. Separately, the remaining sub-pixels 202, 203, and 204 may differently be determined to be, nor to be, anti-aliased.

According to the pessimistic determination, when any one of the differences between the characteristic value 200 and the characteristic values of the three neighboring pixels 210, 220, and 240 is greater than or equal to the predetermined threshold, the sub-pixel 201 may be determined as the sub-pixel to be anti-aliased.

According to the pessimistic determination, when at least one pixel among three pixels adjacent to the sub-pixel 201 has a characteristic value of at least predetermined difference with respect to the characteristic value of the current pixel 200 including the sub-pixel 201, the sub-pixel 201 may be selected to be super-sampled for anti-aliasing.

According to the above criterion, the sub-pixels 202 and 203 may each be determined to be super-sampled for anti-aliasing, while the sub-pixel 204 may be determined to not be super-sampled.

According to another embodiment, instead of using the characteristic value, an inner product between a normal vector of an object colliding with a primary ray departing from a current pixel and a unit vector of primary ray direction may be calculated. When an absolute value of the inner product is less than or equal to a second threshold, for example, "0.1", the current pixel may be determined as a target to be super-sampled.

When the determination is made based on "a sub-pixel unit," a sub-pixel to be super-sampled is selected by making a single sampling ray depart from respective sub-pixels, such as each sub-pixel, calculating an inner product between a normal vector of a colliding portion and a unit vector of a sampling ray direction, and comparing the inner product and the second threshold.

Accordingly, in an embodiment, when the determination is made on a sub-pixel unit, four additional ray tracings may be performed with respect to each sub-pixel determined to be super-sampled. Here, the number of additional ray tracings performed with respect to each sub-pixel may be variously determined.

Depending on embodiments, additional ray tracing may be performed a different number of times with respect to each of the sub-pixels 201, 202, and 203, e.g., when anti-aliasing is not determined for sub-pixel 204. In this case, additional ray tracing may be performed a relatively large number of times with respect to a sub-pixel further adjacent to neighboring pixels having characteristic values of at least difference with respect to the characteristic value of the current pixel 200.

A process of performing additional ray tracings will be further described with reference to FIG. 5.

Figure 5:
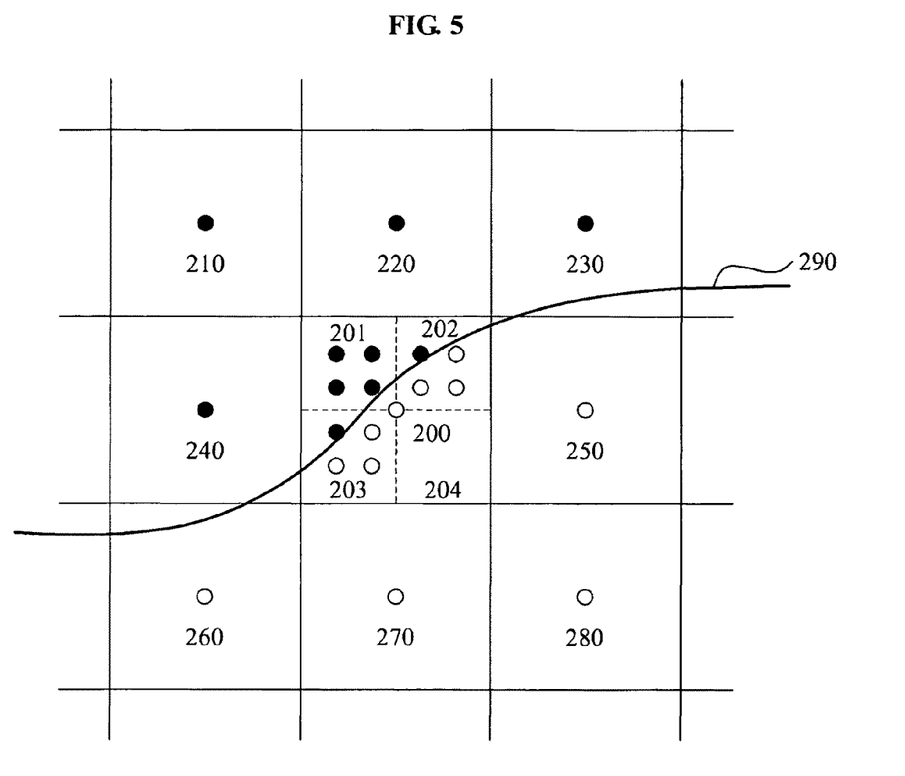
FIG. 5 illustrates a process of performing super-sampling based on a sub-pixel unit, according to one or more embodiments.

FIG. 5 illustrates a process of performing super-sampling based on the sub-pixel unit, according to one or more embodiments.

Four additional ray tracings are performed with respect to the sub-pixel 201. Color values C11, C12, C13, and C14, for sub-pixel 201, are calculated according to the four additional ray tracings. Among the four additional ray tracings, an initial collision with the object 1 is determined to have occurred four times.

Four additional ray tracings are also performed with respect to the sub-pixel 202. Color values C21, C22, C23, and C24, for sub-pixel 202, are calculated according to the four additional ray tracings. Among the four additional ray tracings, an initial collision with the object 1 is determined to have occurred once and an initial collision with the object 2 is determined to have occurred three times.

Four additional ray tracings are also performed with respect to the sub-pixel 203. Color values C31, C32, C33, and C34, for sub-pixel 203, are calculated according to the four additional ray tracings. Among the four additional ray tracings, an initial collision with the object 1 is determined to have occurred once and an initial collision with the object 2 is determined to have occurred three times.

When the initial color value of the current pixel 200 is C0, a post-correction color value C of the current pixel 200 may be determined by the below Equation 1, for example.

$$C = \frac{1}{16} * (C11 + C12 + C13 + C14 + C21 + C22 + C23 + C24 + C31 + C32 + C33 + C34) + \frac{1}{4} * C0 \quad \text{Equation 1}$$

As shown in Equation 1, C may be obtained by multiplying a weight by color values calculated through additional ray tracing, and by calculating a linear summation of the multiplication results.

A process of calculating a color value after anti-aliasing of the current pixel 200, that is, a process of calculating C of the current pixel 200 is described above with reference to FIGS. 5 and 6. The aforementioned descriptions may be applicable to other pixels.

For example, in the case of calculating a color value after anti-aliasing of the pixel 210, the pixel 210 may be divided into a plurality of sub-pixels, for example, four sub-pixels and four additional ray tracings may be performed with respect to only a right bottom sub-pixel (not shown) adjacent to the pixel 200 having a different characteristic value from a characteristic value of the pixel 210. In this example, when an initial color value of the pixel 210 is C0', color values calculated through the four additional ray tracings are C41, C42, C43, and C44, and a color value after anti-aliasing, that is, after super-sampling of the pixel 210 is C', C' may be determined by, the below Equation 2, for example.

$$C' = \frac{1}{16} * (C41 + C42 + C43 + C44) + \frac{3}{4} * C0' \quad \text{Equation 2}$$

Figure 6:
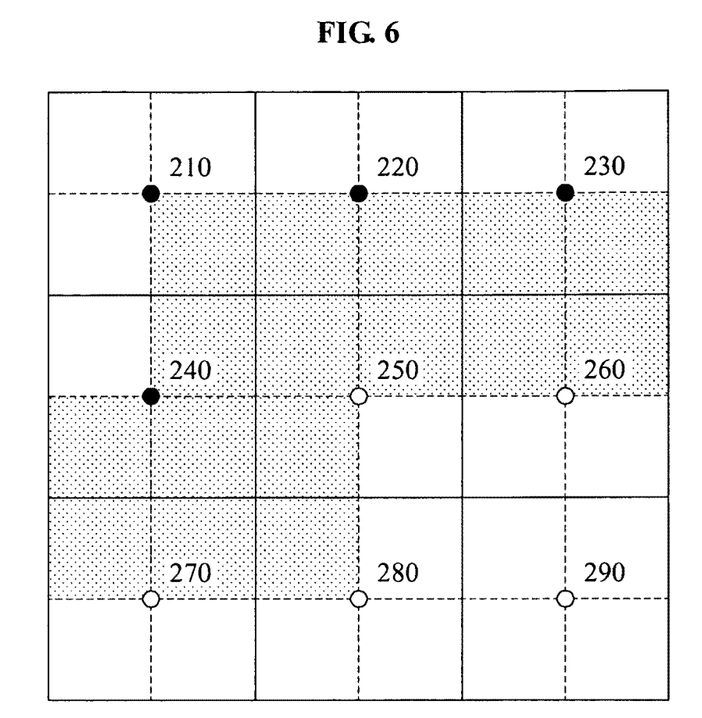
FIG. 6 illustrates a case where 16 sub-pixels to be anti-aliased are selected from 36 sub-pixels respectively for nine pixels, according to one or more embodiments.

FIG. 6 illustrates a case where 16 sub-pixels to be anti-aliased are selected from 36 sub-pixels respectively for the nine pixels 210, 220, 230, 240, 250, 260, 270, 280, and 290, according to one or more embodiments.

Referring to FIG. 6, each of the pixels 210, 220, 230, 240, 250, 260, 270, 280, and 290 can be divided into four sub-pixels. Sub-pixels to be super-sampled are selected from a total of 36 sub-pixels according to a scheme described above with reference to FIGS. 4 and 6, for example. Here, a total of 16 sub-pixels, illustrated by dots in FIG. 6, are selected, i.e., 16 sub-pixels out of 36 available sub-pixels are selected.

Figure 7:
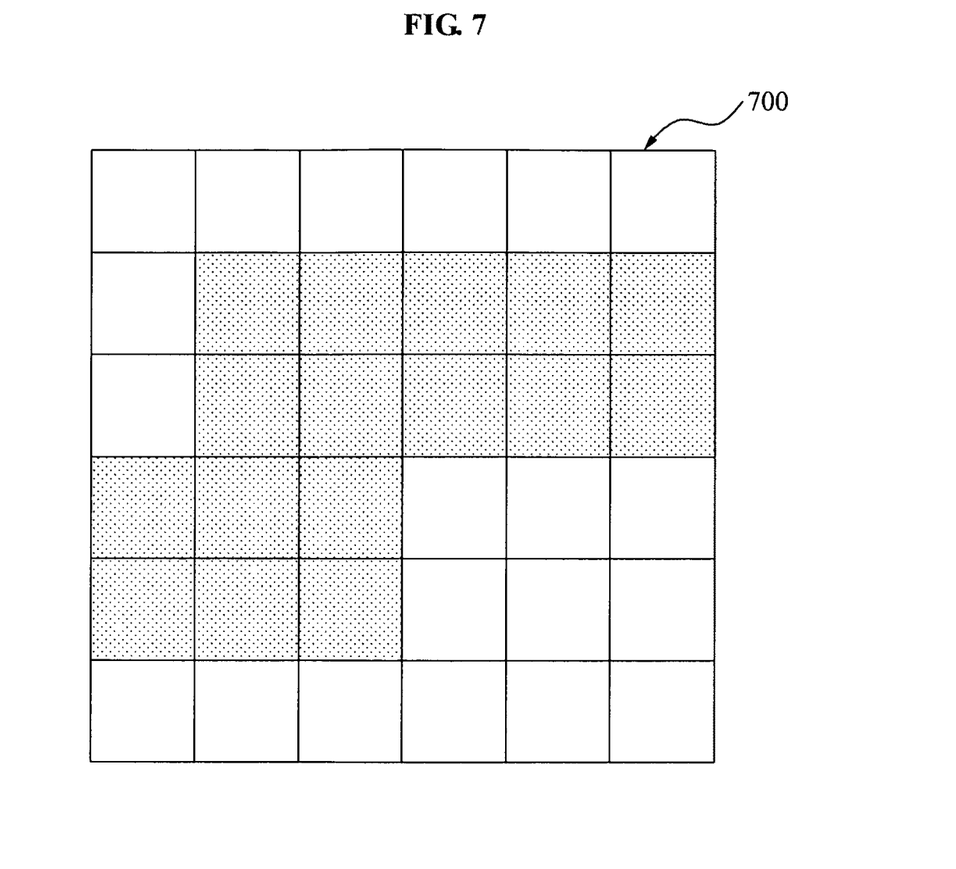
FIG. 7 illustrates a case where selected sub-pixels to be anti-aliased are stored in a buffer memory, according to one or more embodiments.

FIG. 7 illustrates a case where selected sub-pixels to be anti-aliased are stored in a buffer memory 700, according to one or more embodiments.

The 16 sub-pixels selected in FIG. 6 may be stored in the buffer memory 700 as shown in FIG. 7. This storage scheme may not use separate synchronization and additional storage data according to a location change. However, storing the selected sub-pixels as shown in FIG. 7 may be ineffective in a parallel processing environment such as a multi-threading environment. In the case of super-sampling according to parallel processing based on a block unit, a portion where sub-pixels are not stored may be wasted.

Figure 8:
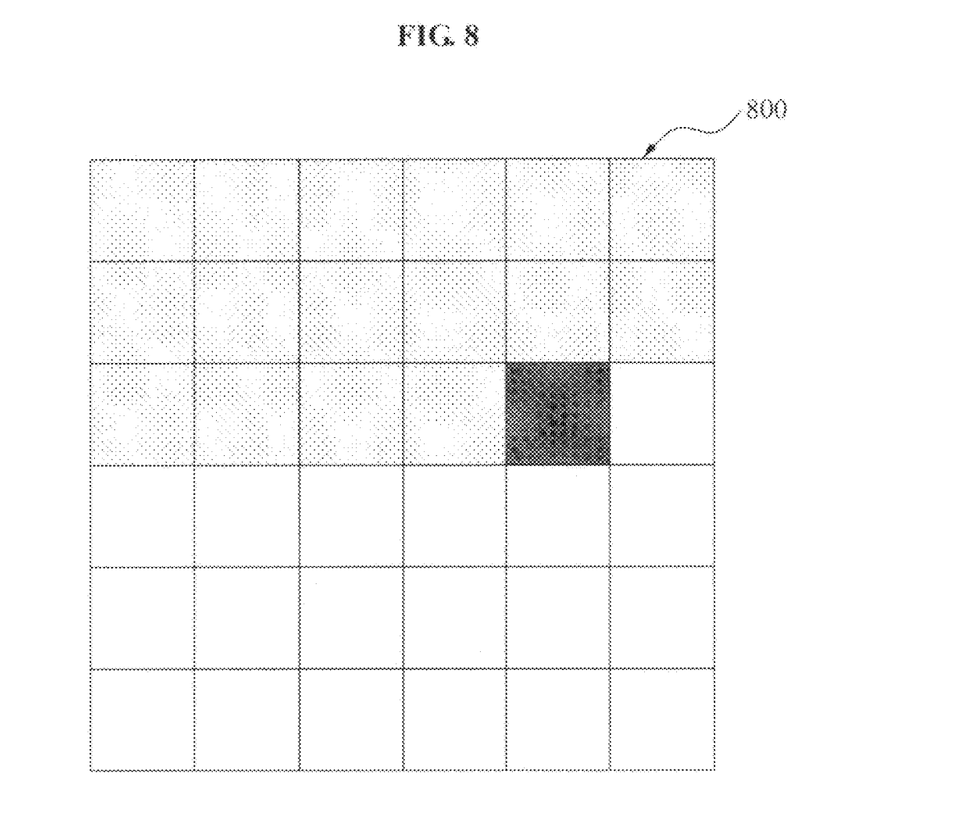
FIG. 8 illustrates a case where selected sub-pixels to be anti-aliased are sequentially stored in a buffer memory, according to one or more embodiments.

Accordingly, in an embodiment, to enhance efficiency, a different type of scheme of storing sub-pixels in a buffer memory may be applied, as shown in FIG. 8.

FIG. 8 illustrates a case where selected sub-pixels to be anti-aliased are sequentially stored in a buffer memory 800, according to one or more embodiments.

Referring to FIG. 8, 16 selected sub-pixels are sequentially stored in the buffer memory 800 and an indicating tag is stored last.

The above storage scheme may be appropriate for a parallel processing scheme such as a multi-threading scheme, a single instruction multiple data (SIMD) architecture, and the like.

Figure 9:
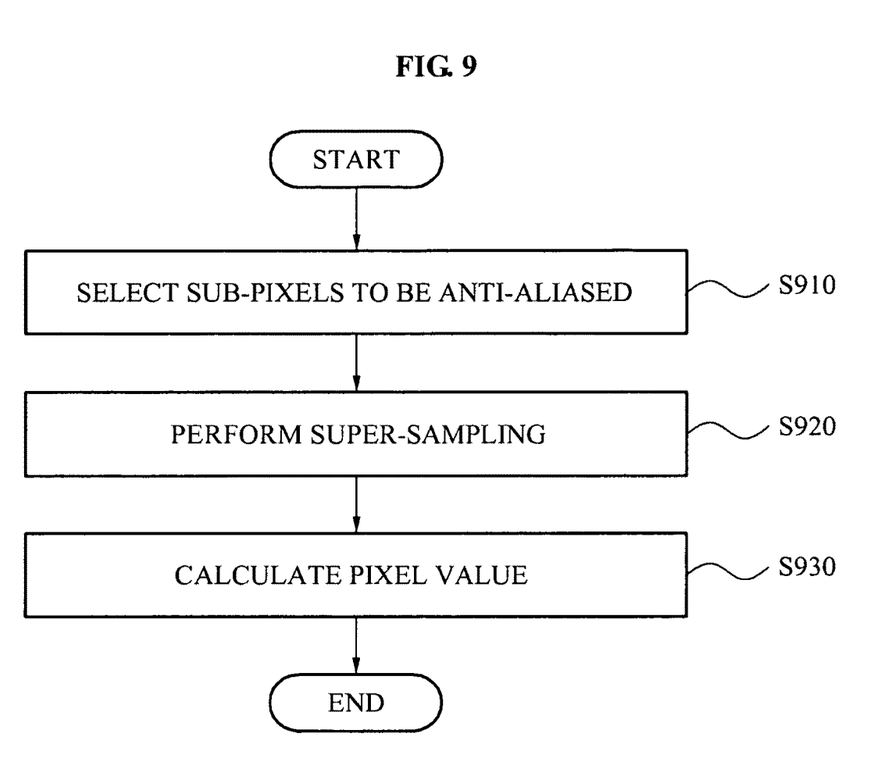
FIG. 9 illustrates an image processing method, according to one or more embodiments.

FIG. 9 illustrates an image processing method, according to one or more embodiments.

In operation S910, sub-pixels to be anti-aliased may be selected from a plurality of sub-pixels of a current pixel. For example, one or more of the sub-pixels 201, 202, and 203 of FIG. 4 may be selected from the sub-pixels 201, 202, 203, and 204 of the current pixel 200 for anti-aliasing.

A process of selecting the sub-pixels to be anti-aliased is described above with reference to FIG. 4, for example.

In operation S920, super-sampling may be performed with respect to the selected sub-pixels 201, 202, and 203, e.g., as sub-pixel 204 has not been selected for anti-aliasing. Additional color values may be calculated by performing additional ray tracing a plurality of number of times with respect to each of the selected sub-pixels. A corresponding process is described above with reference to FIG. 5, for example.

In operation S930, a final color value may be calculated by applying a weight to the additional color values, and by calculating a linear summation thereof, for example. Further detailed description related thereto is described above with reference to FIG. 5, and Equation 1 and Equation 2, again noting that alternatives are also available.

Figure 10:
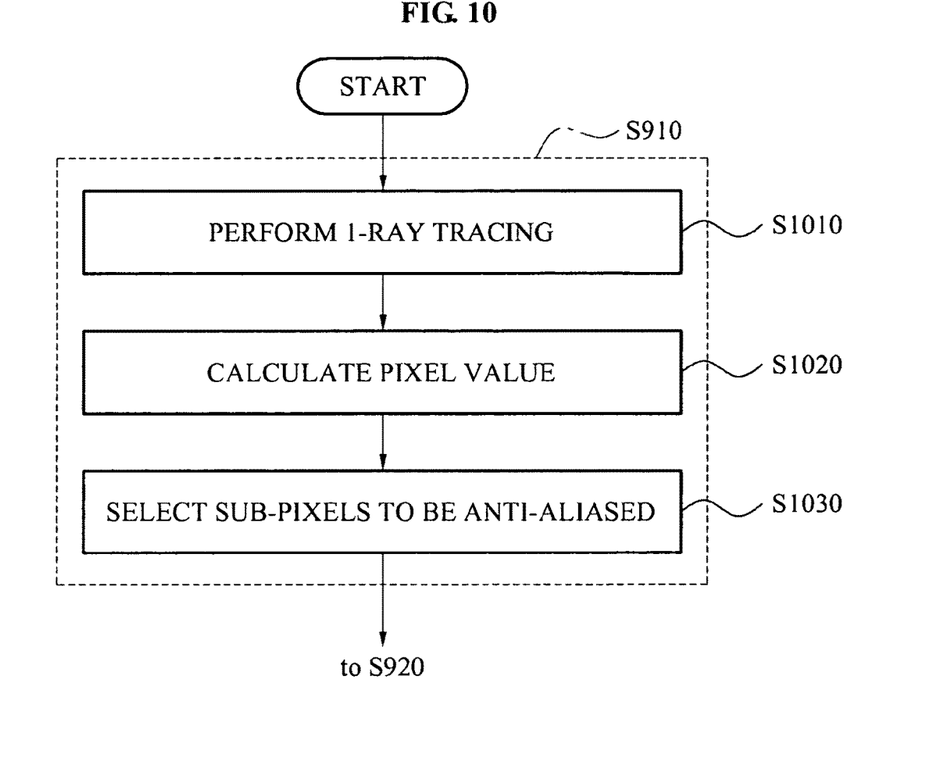
FIG. 10 illustrates an operation of selecting sub-pixels to be anti-aliased of FIG. 9, according to one or more embodiments.

FIG. 10 illustrates operation S910 of selecting sub-pixels to be anti-aliased of FIG. 9, according to one or more embodiments.

In operation S1010, ray tracing may be performed once with respect to each of the entire pixels, i.e., at "a pixel unit" level. An initial color value of each pixel may thus be calculated.

The initial color value denotes a value in which anti-aliasing has not been performed.

In operation S1020, a characteristic value of each pixel may be calculated. The characteristic value may be calculated based on, for example, an object ID of an object colliding with a primary ray, a normal vector, a shadow count, a texture state, and the like. Further detailed description related to the characteristic value is described above with reference to FIG. 4.

In operation S1030, sub-pixels to be anti-aliased may be selected from the plurality of sub-pixels. The selection may be made based on a difference between characteristic values. A threshold according to a color difference may be applicable. Accordingly, as noted above, thereafter, in an embodiment, ray tracing can be performed at the sub-pixel unit level during super-sampling of select sub-pixels.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of computer readable code include both machine code, such as produced by a compiler, and files containing higher level code that may be executed by the computer using an interpreter, for example. The media may also be a distributed network, so that the computer readable code is stored and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An image processing apparatus, comprising:
a selector to determine, from a plurality of sub-pixels included in a first pixel, which sub-pixels of the plurality of sub-pixels should receive an anti-aliasing process; and
a processor to calculate a color value of the first pixel by performing the anti-aliasing process with respect to a selected sub-pixel of the first pixel having been determined to receive the anti-aliasing process,
wherein the anti-aliasing process of the selected sub-pixel of the first pixel includes performing ray-tracing a plurality of times with respect to the selected sub-pixel based on the determining,
wherein the selector determines which sub-pixels of the plurality of sub-pixels should receive the anti-aliasing process based on a comparison of the first pixel with surrounding pixels using an initial color value and a characteristic value of each of the first pixel and surrounding pixels, and
wherein the characteristic value is a basic reference value used to determine whether each pixel is close to a boundary between objects,
wherein the selector performs ray tracing with respect to the first pixel and neighboring pixels adjacent to the first pixel using a single ray, to calculate the initial color value and the characteristic value, and performs additional ray tracing on the plurality of sub-pixels, and
wherein the additional ray tracing is performed a different number of times with respect to each of the plurality of sub-pixels.

2. The image processing apparatus of claim 1, wherein the anti-aliasing process corresponds to a super-sampling operation of only sub-pixels determined to receive the anti-aliasing process.

3. The image processing apparatus of claim 1, wherein when an inner product between a normal vector corresponding to an intersecting point of an object and a normal direction of a predetermined sub-pixel among the plurality of sub-pixels, and a normal vector of the first pixel is less than or equal to a second threshold, the selector determines the predetermined sub-pixel to be the sub-pixel to receive the anti-aliasing process.

4. The image processing apparatus of claim 1, further comprising:
a buffer memory to sequentially store sub-pixels determined to be anti-aliased by the selector,
wherein the processor performs super-sampling of the stored sub-pixels according to a single instruction multiple data (SIMD) architecture, and calculates the color value of the first pixel using a linear summation of results of the super-sampling and an initial color value of the first pixel calculated before the selected pixel is determined to receive the anti-aliasing process.

5. The image processing apparatus of claim 1, wherein the selector:
performs ray tracing with respect to the first pixel and eight neighboring pixels adjacent to the first pixel using a single ray, to calculate respective initial color values and characteristic values of each of the first pixel and the eight neighboring pixels, and
compares the characteristic value of the first pixel with the characteristic value of each of the eight neighboring pixels in the determining, from the plurality of sub-pixels included in the first pixel, of which of the sub-pixels of the first pixel are to receive the anti-aliasing process.

6. The image processing apparatus of claim 5, wherein the characteristic values are calculated based on an object identifier of an object colliding with respective single rays.

7. The image processing apparatus of claim 5, wherein the characteristic values are calculated based on at least one of a shadow count, a texture state, and a normal vector of a portion of an object colliding with the single ray.

8. The image processing apparatus of claim 5, wherein when a difference between the initial color value of the first pixel and the initial color value of each of the eight neighboring pixels is greater than or equal to a first threshold, the selector compares the characteristic value of the first pixel with the characteristic value of each of the eight neighboring pixels to select, from the plurality of sub-pixels included in the first pixel, the sub-pixel to receive the anti-aliasing process.

9. The image processing apparatus of claim 1, wherein an initial color of the first pixel is calculated based on a ray tracing with respect to the first pixel performed before the determining of which sub-pixels of the plurality of sub-pixels of the first pixel should receive the anti-aliasing process.

10. The image processing apparatus of claim 1, wherein the determining of which sub-pixels of the plurality of sub-pixels should receive the anti-aliasing process is selectively performed based upon a determination that the first pixel should receive the anti-aliasing process.

11. The image processing apparatus of claim 1, wherein the determining of which sub-pixels of the plurality of sub-pixels should receive the anti-aliasing process is based upon a boundary characteristic, for identifying a boundary between objects, calculated based on an initial ray tracing of the first pixel performed before the determining.

12. The image processing apparatus of claim 11, wherein the characteristic is determined based on an object identifier of an object colliding with the initial ray.

13. The image processing apparatus of claim 11, wherein the characteristic is determined based on at least one of a shadow count, a texture state, and a normal vector of a portion of an object colliding with the initial ray.

14. An image processing apparatus, comprising:
a selector to select, from a plurality of sub-pixels included in a first pixel, a sub-pixel to receive an anti-aliasing process; and
a processor to calculate a color value of the first pixel by the anti-aliasing process with respect to the selected sub-pixel,
wherein the selector performs ray tracing with respect to the first pixel and eight neighboring pixels adjacent to the first pixel using a single ray, to calculate an initial color value and a characteristic value of each of the first pixel and the eight neighboring pixels,
wherein the selector performs additional ray tracing on the plurality of the sub-pixels,
wherein the selector compares the characteristic value of the first pixel with the characteristic value of each of the eight neighboring pixels to select, from the plurality of sub-pixels included in the first pixel, the sub-pixel to receive the anti-aliasing process,
wherein the characteristic value is a basic reference value used to determine whether each pixel is close to a boundary between objects, and
wherein the additional ray tracing is performed a different number of times with respect to each of the plurality of sub-pixels.

15. The image processing apparatus of claim 14, wherein the characteristic value is determined based on an object identifier of an object colliding with the single ray.

16. The image processing apparatus of claim 14, wherein the characteristic value is determined based on at least one of a shadow count, a texture state, and a normal vector of a portion of an object colliding with the single ray.

17. The image processing apparatus of claim 14, wherein when a difference between the initial color value of the first pixel and the initial color value of each of the eight neighboring pixels is greater than or equal to a first threshold, the selector compares the characteristic value of the first pixel with the characteristic value of each of the eight neighboring pixels to select, from the plurality of sub-pixels included in the first pixel, the sub-pixel to receive the anti-aliasing process.

18. An image processing method, comprising:
determining, from a plurality of sub-pixels included in a first pixel, which sub-pixels of the plurality of sub-pixels should receive an anti-aliasing process; and
calculating, using at least one processing device, a color value of the first pixel by performing the anti-aliasing process with respect to a selected sub-pixel of the first pixel having been determined to receive the anti-aliasing process,
performing, using a selector, ray tracing with respect to the first pixel and neighboring pixels adjacent to the first pixel using a single ray, to calculate an initial color value and a characteristic value, and
performing, using the selector, additional ray tracing on the plurality of sub-pixels, wherein the additional ray tracing is performed a different number of times with respect to each of the plurality of sub-pixels, wherein the anti-aliasing process of the selected sub-pixel of the first pixel includes performing ray-tracing a plurality of times with respect to the selected sub-pixel based on the determining, wherein the determining which sub-pixels of the plurality of sub-pixels should receive the anti-aliasing process is based on a comparison of the first pixel with surrounding pixels using the initial color value and the characteristic value of each of the first pixel and surrounding pixels, and wherein the characteristic value is a basic reference value used to determine whether each pixel is close to a boundary between objects.

19. The image processing method of claim 18, wherein the anti-aliasing process corresponds to a super-sampling operation of only sub-pixels determined to receive the anti-aliasing process.

20. The image processing method of claim 18, wherein the determining of which sub-pixels of the plurality of sub-pixels should receive the anti-aliasing process comprises:
performing ray tracing with respect to the first pixel and eight neighboring pixels adjacent to the first pixel using a single ray, to calculate respective initial color values and characteristic values of each of the first pixel and the eight neighboring pixels; and
comparing the characteristic value of the first pixel with the characteristic value of each of the eight neighboring pixels in the determining, from the plurality of sub-pixels included in the first pixel, of which sub-pixels of the first pixel are to receive the anti-aliasing process.

21. The image processing method of claim 20, wherein the characteristic values are calculated based on an object identifier of an object colliding with respective single rays.

22. The image processing method of claim 20, wherein the characteristic values are calculated based on at least one of a shadow count, a texture state, and a normal vector of a portion of an object colliding with the single ray.

23. The image processing method of claim 20, wherein the determining of which sub-pixels of the plurality of sub-pixels should receive the anti-aliasing process further comprises comparing the characteristic value of the first pixel with the characteristic value of each of the eight neighboring pixels to select, from the plurality of sub-pixels included in the first pixel, the sub-pixel to receive the anti-aliasing process, when a difference between the initial color value of the first pixel and the characteristic value of each of the eight neighboring pixels is greater than or equal to a first threshold.

24. The image processing method of claim 18, wherein the determining of which sub-pixels of the plurality of sub-pixels should receive the anti-aliasing process comprises selecting a predetermined sub-pixel among the plurality of sub-pixels as the sub-pixel to receive the anti-aliasing process when an inner product between a normal vector corresponding to an intersecting point of an object and a normal direction of the predetermined sub-pixel, and a normal vector of the first pixel is less than or equal to a second threshold.

25. The image processing method of claim 18, wherein the calculating comprises:
sequentially storing selected sub-pixels determined to be anti-aliased, selected from the plurality of sub-pixels, in a buffer memory;
performing super-sampling of the stored sub-pixels according to a single instruction multiple data (SIMD) architecture; and
calculating the color value of the first pixel using a linear summation of results of the super-sampling and an initial color value of the first pixel calculated before the selected pixel is determined to receive the anti-aliasing process.

26. A non-transitory computer-readable recording medium comprising computer readable code to control at least one processing element to implement the method of claim 18.

27. The image processing method of claim 18, wherein an initial color of the first pixel is calculated based on an initial ray tracing with respect to the first pixel performed before the determining of which sub-pixels of the plurality of sub-pixels of the first pixel should receive the anti-aliasing process.

28. The image processing method of claim 18, wherein the determining of which sub-pixels of the plurality of sub-pixels should receive the anti-aliasing process is selectively performed based upon a determination that the first pixel should receive the anti-aliasing process.

29. The image processing method of claim 18, wherein the determining of which sub-pixels of the plurality of sub-pixels should receive the anti-aliasing process is based upon a boundary characteristic, for identifying a boundary between objects, calculated based on an initial ray tracing of the first pixel performed before the determining of which sub-pixels of the plurality of sub-pixels of the first pixel should receive the anti-aliasing process.

30. The image processing method of claim 29, wherein the characteristic is determined based on an object identifier of an object colliding with the initial ray.

31. The image processing method of claim 29, wherein the characteristic is determined based on at least one of a shadow count, a texture state, and a normal vector of a portion of an object colliding with the initial ray.

32. An image processing apparatus, comprising:
a selector to determine, from a plurality of sub-pixels included in a first pixel, respectively which sub-pixels of the first pixel receive an anti-aliasing process; and
a processor to calculate a color value of the first pixel based on anti-aliased sub-pixels and non-anti-aliased sub-pixels of the first pixel, as determined by the selector,
wherein the selector determines which of the sub-pixels of the first pixel should receive the anti-aliasing process based on comparisons of a calculated characteristic value of the first pixel and calculated characteristic values of at least respectively different pixels surrounding the first pixel for each comparison, and
wherein the characteristic value is a basic reference value used to determine whether each pixel is close to a boundary between objects,
wherein the selector performs ray tracing with respect to the first pixel and neighboring pixels adjacent to the first pixel using a single ray, to calculate an initial color value and the characteristic value, and performs additional ray tracing on the plurality of sub-pixels,
wherein the additional ray tracing is performed a different number of times with respect to each of the plurality of sub-pixels.

33. The image processing apparatus of claim 32, wherein the characteristic values of the first pixel and the different pixels surrounding the first pixel are calculated based upon respective initial ray tracings, with respective initial ray tracings of the different pixels surrounding the first pixel being performed before the selector determines whether respective adjacent sub-pixels of the first pixel are determined to receive the anti-aliasing process.

34. The image processing apparatus of claim 33, wherein the processor performs the anti-aliasing process by performing plural ray tracings of each sub-pixel having been determined to receive the anti-aliasing process by the selector.

35. An image processing method, comprising:
  determining, from a plurality of sub-pixels included in a first pixel, respectively which sub-pixels of the first pixel receive the anti-aliasing process, the determining being based on comparisons of a calculated characteristic value of the first pixel and calculated characteristic values of at least respectively different pixels surrounding the first pixel for each comparison; and
  calculating a color value of the first pixel based on anti-aliased sub-pixels, performed based upon the determining, and non-anti-aliased sub-pixels of the first pixel,
  performing, using a selector, ray tracing with respect to the first pixel and neighboring pixels adjacent to the first pixel using a single ray, to calculate an initial color value and the characteristic value, and
  performing, using the selector, additional ray tracing on the plurality of sub-pixels,
  wherein the additional ray tracing is performed a different number of times with respect to each of the plurality of sub-pixels, and
  wherein the characteristic value is a basic reference value used to determine whether each pixel is close to a boundary between objects.

36. The image processing method of claim 35, wherein the characteristic values of the first pixel and the different pixels surrounding the first pixel are calculated based upon respective initial ray tracings, with respective initial ray tracings of the different pixels surrounding the first pixel being performed before the selector determines whether respective adjacent sub-pixels of the first pixel are determined to receive the anti-aliasing process.

37. The image processing method of claim 36, further comprising performing the anti-aliasing process by performing plural ray tracings of each sub-pixel having been determined to receive the anti-aliasing process by the determining.

* * * * *